(12) United States Patent
Chan et al.

(10) Patent No.: US 8,391,350 B2
(45) Date of Patent: Mar. 5, 2013

(54) ADAPTATION CIRCUITRY AND METHODS FOR DECISION FEEDBACK EQUALIZERS

(75) Inventors: Doris Po Ching Chan, Santa Clara, CA (US); Thungoc M. Tran, San Jose, CA (US)

(73) Assignee: Altera Corporation, San Jose, CA (US)

( * ) Notice: Subject to any disclaimer, the term of this patent is extended or adjusted under 35 U.S.C. 154(b) by 256 days.

(21) Appl. No.: 12/875,703

(22) Filed: Sep. 3, 2010

(65) Prior Publication Data

US 2012/0057627 A1     Mar. 8, 2012

(51) Int. Cl.
*H03K 5/159*     (2006.01)
(52) U.S. Cl. ......... 375/233; 375/316; 375/229; 375/232
(58) Field of Classification Search .................. 375/316, 375/233, 232, 229
See application file for complete search history.

(56) References Cited

U.S. PATENT DOCUMENTS

| | | | | |
|---|---|---|---|---|
| 7,668,238 | B1 * | 2/2010 | Rokhsaz .................... | 375/233 |
| 7,817,714 | B2 * | 10/2010 | Bae et al. ................... | 375/233 |
| 8,098,588 | B1 * | 1/2012 | Berndt et al. ............... | 370/252 |
| 8,213,494 | B2 * | 7/2012 | Hidaka ........................ | 375/233 |
| 2005/0094723 | A1 * | 5/2005 | Takatori ...................... | 375/232 |
| 2005/0265440 | A1 | 12/2005 | Sohn | |
| 2008/0260016 | A1 | 10/2008 | Lapointe et al. | |
| 2010/0008414 | A1 * | 1/2010 | Lee et al. .................... | 375/233 |
| 2010/0103998 | A1 * | 4/2010 | Erba et al. ................... | 375/233 |
| 2010/0134256 | A1 | 6/2010 | Mihota | |
| 2011/0115660 | A1 * | 5/2011 | Singer et al. ................ | 341/155 |
| 2012/0057626 | A1 * | 3/2012 | Zhong ......................... | 375/233 |

* cited by examiner

*Primary Examiner* — Siu Lee

(74) *Attorney, Agent, or Firm* — Ropes & Gray LLP; Jeffrey H. Ingerman

(57) ABSTRACT

Decision feedback equalizer ("DFE") circuitry bases determination of the coefficients that are used in its various taps on the algebraic sign of the current value of an error signal and prior serial data signal values output by the DFE circuitry. Use of such algebraic sign information (rather than full error signal values) greatly simplifies the circuitry needed to determine the tap coefficients. The DFE circuitry can be adaptive, i.e., such that it automatically adjusts the tap coefficients for changing serial data signal transmission conditions.

20 Claims, 4 Drawing Sheets

| Line No. | Input Condition | 320a Output | 320c Output | 320b Output | Sign Error Output |
|---|---|---|---|---|---|
| 1 | y(n) > Vrh | 1 | 1 | 1 | 1 |
| 2 | Vrh > y(n) > Vth | 0 | 1 | 1 | 0 |
| 3 | Vth > y(n) > Vrl | 0 | 1 | 0 | 1 |
| 4 | y(n) < Vrl | 0 | 0 | 0 | 0 |

ADAPTATION CIRCUITRY AND METHODS FOR DECISION FEEDBACK EQUALIZERS

BACKGROUND

This disclosure relates to electronic circuitry, and more particularly to circuitry for recovering data information from a serial data signal received by the circuitry.

Communication of data between components of a system by means of so-called high-speed serial data signals is of increasing interest and importance to electronic system designers and users. For example, such a signal may have a data bit rate of about 1 gigabits per second (1 Gbps) or more; and data rates much higher than that (e.g., up to 10 Gbps or more) are now in use or at least contemplated. (A bit is a binary digit, typically having a value of either 1 or 0.)

Illustrative use of high-speed serial data signals is for conveying data from one integrated circuit ("IC") in a system to another IC in the system. For example, these two ICs may be mounted on a printed circuit board ("PCB"), with one or more signal traces on the PCB being used to make a serial data signal connection between the ICs. (A serial data signal may be either a so-called single-ended signal having only one signal constituent and therefore requiring only one conductor (e.g., one PCB circuit trace) to convey it between ICs; or the serial data signal may be a so-called differential signal having two logically complementary signal constituents (one constituent high when the other constituent is low, and vice versa) and therefore requiring two conductors (e.g., two PCB circuit traces) to convey it between ICs. It will generally not matter herein whether the serial data signal is transmitted in single-ended or differential form, and so this possible variation among different systems will usually be ignored in this disclosure. Also, the singular term "serial data signal" will generally be used as a generic term for both single-ended and differential serial data signals (even though a differential serial data signal actually comprises two complementary signal constituents).)

Another example of a system construction in which a high-speed serial data signal may be used for conveying data between two ICs is a construction in which each IC is on a different PCB, and both PCBs are mounted on a so-called back-plane ("BP") circuit. The serial data signal may be transmitted via circuit traces on the PCBs that are connected to one another via one or more additional circuit traces on the BP.

The foregoing are only some examples of how high-speed serial data signals may be used, and it will be appreciated that there are many other contexts in which such signals may be used.

A problem that is common to many uses of high-speed serial data signals is that they are generally subject to loss of clarity or fidelity as they propagate through whatever medium is used to transmit them. Such loss of fidelity (which can also be characterized using any of many other terms such as signal degradation, attenuation, loss, noise, inter-symbol-interference ("ISI"), etc.) tends to become more of a problem as the data rate (serial bit rate) of the signal increases. In particular, higher frequencies are needed to transmit higher serial data rates; but high frequency signals tend to be more seriously degraded by the transmission media often used for transmission of high-speed serial data signals. Thus (again) the higher the data rate of a serial data signal, the more transmission degradation it is generally subject to.

Degradation of a high-speed serial data signal (e.g., as described above from an IC transmitting that signal through a transmission medium to another IC receiving the signal) increases the difficulty that the receiving (receiver, "RX") IC has in correctly interpreting the data information in the received signal. For example, some individual bits in the received signal may not achieve adequate or correct voltage differentiation from the threshold voltage that is used by input circuitry of the RX IC to distinguish a binary 1 (e.g., received serial data signal voltage above the threshold voltage) from a binary 0 (e.g., received serial data signal voltage below the threshold voltage). The RX IC may therefore incorrectly interpret the data value of such a bit (e.g., mistakenly interpreting a transmitted ("TX") binary 1 as a binary 0, or mistakenly interpreting a TX binary 0 as a binary 1.

To help compensate for the signal degradation that can cause or contribute to such RX data interpretation errors, an RX IC may be equipped with any one or more of so-called equalization circuits for early-stage or preliminary processing of a received high-speed serial data signal (e.g., prior to any attempt to recover data information from that signal in more downstream circuitry). In general, the purpose of such equalization circuitry is to try to compensate for or ameliorate degradation that the high-speed serial data signal has been subjected to on its way to the RX IC and thereby improve the reliability of the RX IC in accurately recovering all data information from the received signal. For example, one type of such equalizer circuitry is so-called decision feedback equalizer ("DFE") circuitry.

As the serial data bit rate of a high-speed serial data signal increases, the number of "taps" required in a DFE circuit in order for that circuit to remain an effective equalizer for the signal tends to increase. Each tap typically includes a circuit for multiplying a respective earlier (previously received) data bit value (e.g., the $k^{th}$ data bit value prior to the current bit) by a respective tap coefficient $C_k$ and additively combining all of the resulting products with the incoming signal for the current bit. ("Additively combining" is used herein as a generic term that may include addition, subtraction, or any combination thereof.) If only a small number of taps is required, it may not be too difficult to find an optimal set of DFE tap coefficient values by, for example, a trial-and-error approach in which various combinations of different coefficient values are tried until an acceptably low bit error rate ("BER") is achieved by the RX IC in recovering data information from the received serial data signal. Such an approach becomes less acceptable as the number of taps needed in the DFE circuitry increases (e.g., to provide effective equalization for serial data signals with higher serial data bit rates). Also, some systems of the general type being discussed herein may require so-called adaptive equalization in which the DFE tap coefficients change from time to time (or on an on-going or continuous basis) to keep the DFE circuitry performing effectively despite possible changes in other aspects of system performance, especially system performance changes that change the degradation experienced by the serial data signal on its way to the RX IC. Especially for systems requiring such adaptive equalization, it is desirable to automate the determination (calculation, recalculation) of DFE tap coefficient values, and to be able to perform such automated determinations efficiently (e.g., without excessive processing power and/or processing circuitry being required).

SUMMARY

In accordance with certain possible aspects of this disclosure, DFE circuitry may base the determination of tap coefficient values on quantizing an error signal of the DFE circuitry to a single bit of error information at any one time. For example, such a single bit of error information may be the algebraic sign of an error signal value. Several progressively more delayed version of an output signal of the DFE circuitry may be processed in accordance with the above single-bit error information to provide a basis for determining a tap coefficient for use in feeding back each delayed version of the DFE output signal. The fact that the error information is only a single bit at any one time greatly simplifies the circuitry needed for determining these tap coefficients.

Further features of the disclosure, its nature and various advantages, will be more apparent from the accompanying drawings and the following detailed description.

DETAILED DESCRIPTION

Figure 1:
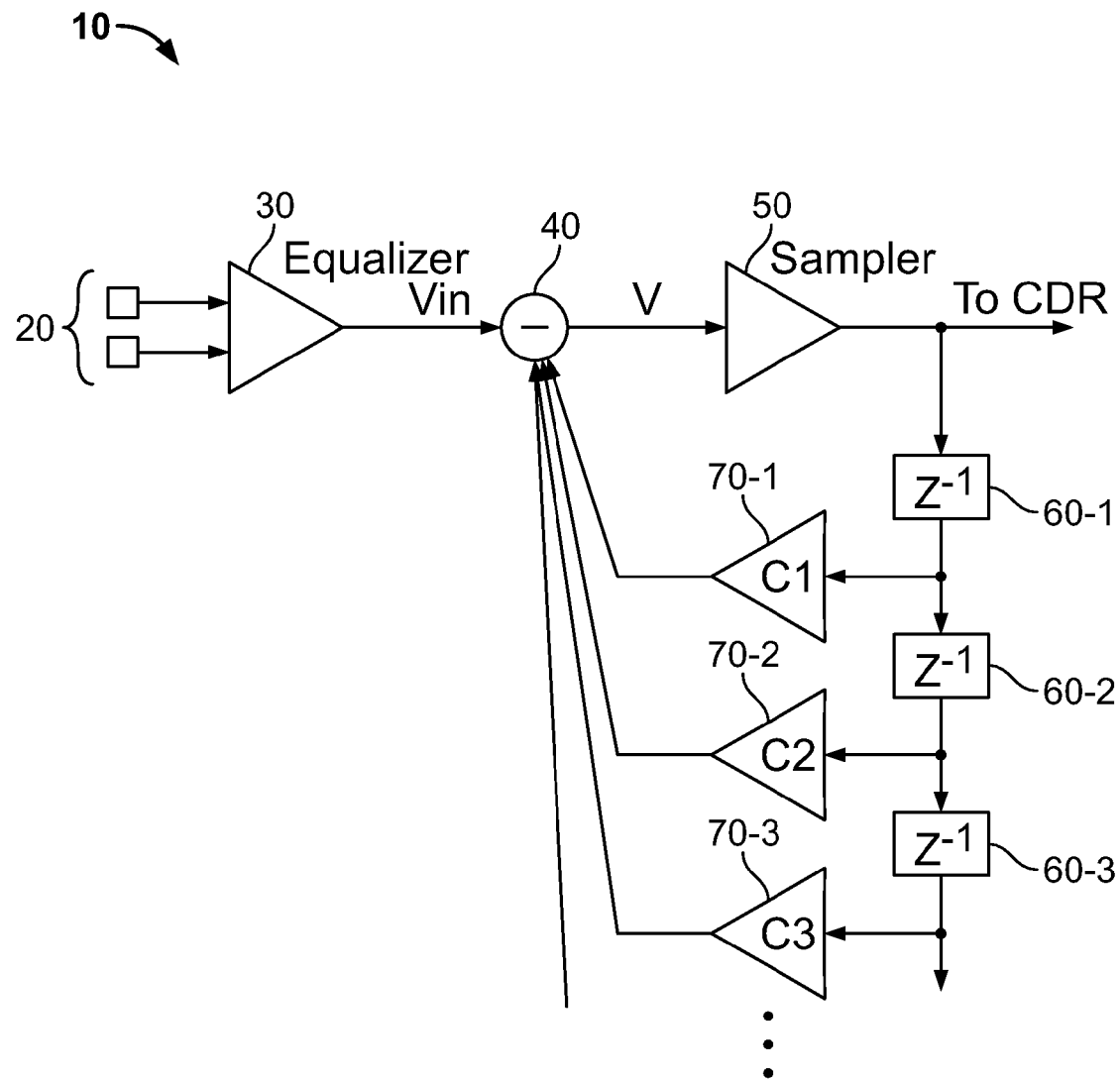
FIG. 1 is a simplified schematic block diagram of illustrative DFE circuitry that can be constructed in accordance with certain possible aspects of this disclosure.

In general, DFE circuitry like DFE circuitry 10 in FIG. 1 is a non-linear equalizer capable of compensating for post-cursor inter-symbol interference ("ISI") and channel reflection. ("Post-cursor" refers to possible erroneous artifacts of the signal information in one unit interval ("UI") of a high-speed serial data signal that contaminate or degrade the signal during one or more subsequent unit intervals of the signal. A UI is the time duration of any one bit in a serial data signal.) DFE circuitry like 10 in FIG. 1 detects the previous bits and compensates their effects on the current bit by subtracting/adding a weighted value from/to the current bit based on the previous data. To successfully eliminate all of the post-cursor ISI, the weighting coefficients C1, C2, C3, etc. of different taps (outputs of delay circuit elements 60-1, 60-2, 60-3, etc.) need to be determined correctly.

Considering illustrative DFE circuitry 10 (FIG. 1) in more detail, a high-speed serial data signal to be processed by an RX IC that includes circuitry 10 is received (in differential form) via a pair of input pads, pins, or terminals 20 of the RX IC. (As noted in the above Background section of this disclosure, this high-speed serial data signal may have been output by another transmitter ("TX") IC in a system that includes the RX IC. The signal may have been transmitted to the RX IC via a communication channel (e.g., PCB circuit traces) that is also part of the system.) FIG. 1 shows two input terminals 20 for receiving a differential high-speed serial data signal; but it will be understood that this signal could alternatively be a single-ended signal requiring only a single input terminal 20.

Element 30 can be input buffer circuitry for receiving and buffering (e.g., amplifying and/or adjusting the voltage level of) the high-speed serial data signal to produce a further serial version Vin of the received signal. From this point on it will be assumed that all signals are single-ended signals (but, again, differential signals can be used instead of single-ended signals wherever desired).

Signal Vin is applied to one input terminal of combiner circuit element 40. Combiner 40 also has several other inputs, i.e., one input from the output of each of scaler circuit elements 70-1, 70-2, 70-3, etc. Combiner 40 is shown as subtracting each of these other inputs from its Vin input. It will be understood, however, that such subtraction in combiner 40 is only an example of how combiner 40 may operate, and that combiner 40 may perform any desired addition or subtraction of its various inputs, or any desired combination of addition and subtraction of its various inputs. For example, to some extent these choices of addition or subtraction for operations performed by combiner 40 may depend on or be influenced by the "sign" or "polarity" that the elements (like 30 and 70) supplying signals to combiner 40 give to those various signals. By way of further elaboration, the sign or polarity of a signal that has a voltage level above a certain threshold may be regarded as positive, while the sign or polarity of a signal having a voltage level below that threshold may be regarded as negative. (This convention can be reversed or inverted if desired.) If an element supplying a signal to combiner 40 always inverts that signal (i.e., always changes the sign or polarity of that signal), then combiner 40 may be constructed to add that input signal (because such addition is equivalent to combiner 40 subtracting the un-inverted version of that signal). It will be appreciated that these are known principles of algebra, and circuitry 10 can be constructed to follow and implement these and other known algebraic principles in various ways without departing from the scope and spirit of the disclosure. For simplicity in at least some of the following discussion, it will sometimes be assumed that combiner 40 subtracts the outputs of elements 70 from Vin to produce combiner output signal V. (But, again, it is emphasized that such simplified references to subtraction in combiner 40 is only to avoid unnecessarily complicating the discussion, and that addition or various combinations of subtraction and addition can be performed by combiner 40 instead if desired.)

Assuming (as noted above) that combiner 40 subtracts the outputs of each of elements 70-1, 70-2, and 70-3 from signal Vin to produce signal V, it will be understood that this subtraction (or any other more general algebraic combination) can be performed in any of a variety of ways. For example, the voltage of the applied signals (e.g., like voltage Vin) can be appropriately combined. Alternatively, each input signal's voltage can be converted to a corresponding (e.g., proportional) electrical current, and the resulting currents can be appropriately combined. The current that results from this combination can then be converted back to a corresponding (e.g., proportional) voltage (i.e., voltage V).

From what has thus far been said about FIG. 1, it will be appreciated that although the high-speed serial data signals discussed herein are basically digital signals (i.e., at any given time, such a signal is intended to have only one of two possible levels or values (e.g., binary 0 or binary 1)), in certain portions of the circuitry the analog aspects of such a signal must be considered and the signal processing and circuitry are more like analog signal processing and circuitry. Thus (for example) all inputs to combiner 40 may be treated like analog signals (e.g., signals that may have any signal level or value throughout a range of possible levels or values), and combiner 40 may be analog circuitry for performing an analog combination of its input signals. Sampler 50 (further discussed below) converts the "analog" output signal of combiner 40 to a more nearly pure, "digital" or "binary" signal (i.e., a signal that is closer to having only one of two possible values at any one time). This more nearly pure, digital signal goes to downstream CDR circuitry, and also propagates through serially connected delay circuit elements 60-1, 60-2, 60-3, etc. However, tap coefficients C1, C2, C3, etc. (used in scaler circuit elements 70-1, 70-2, 70-3, etc.) may be analog values. Accordingly, the scaling effect of each scaler 70 on the delayed digital signal which that scaler operates on may be to produce a scaler output signal that may again be considered analog (because, although it can basically have only one of two levels at any given time, those two levels are typically scaled back from the at least more nearly full binary 1 or binary 0 levels that are output by sampler 50). It may also be more convenient to think of the output signals of scalers 70 as analog because (as has been said) combiner 40 typically operates in the analog domain (i.e., as an analog signal combiner).

The output signal (V) of combiner 40 is applied to sampler circuitry 50. Basically, sampler 50 samples signal V periodically (i.e., at regularly spaced time intervals, such as once per UI and preferably at or near the center (in time) of each UI). For example, sampler 50 may compare each successive sample of V to a reference or threshold voltage, and may output a signal (To CDR) that is either binary 1 or binary 0, depending on how the voltage of that sample of V compares to the threshold voltage used by sampler 50. By way of further illustration, if a sample of V has voltage greater than the threshold, sampler 50 may output a binary 1 signal. On the other hand, if a sample of V has voltage less than the threshold, sampler 50 may output a binary 0 signal. (This output convention may be reversed or inverted if desired.) The timing with which sampler 50 operates to take the above-described samples of signal V may be based on a recovered clock signal produced by clock and data recovery circuitry downstream from the circuitry shown in FIG. 1 (see the next paragraph).

"CDR" in FIG. 1 and elsewhere in this disclosure refers to clock and data recovery circuitry. Such circuitry is typically on the IC that includes circuitry 10, and it is typically used to recover from the output signal of sampler 50 both clock and data signal information that is included in the high-speed serial data signal as output by sampler 50 (i.e., the high-speed serial data signal that was received via terminals 20 and preliminarily processed by elements 30, 40, and 50). The immediately above-mentioned clock information is embodied in the timing of transitions in the high-speed serial data signal between successive bits in that signal. The immediately above-mentioned data information is the succession of data bits (one per UI) in the high-speed serial data signal. For example, the CDR circuitry (which may be conventional) may use the clock information (a recovered clock signal) it recovers from the serial data signal (or a phase-shifted version of that clock information) to time sampling of the serial data signal at or near the center (in time) of each successive UI in order to recover the data bit indicated by the serial data signal in that UI. The thus-recovered data information may be referred to as a retimed data signal.

Each sample of signal V that is output by sampler 50 is also applied to delay circuit element 60-1. Delay element 60-1 delays the signal applied to it by an amount of time equal to the time between successive samples taken by sampler 50. (As noted above this amount of time may be equal to one UI.) For example, element 60-1 (and each succeeding delay element 60-2, 60-3, etc.) may be a register or flip-flop circuit that is clocked by a clock signal having the same frequency as, but somewhat delayed phase relative to, the clock signal that is used to time the taking of samples by sampler 50. Assuming that at any given instant of time the output signal of sampler 50 indicates a "current" bit in the high-speed serial data signal, then the output signal of delay element 60-1 concurrently indicates the immediately preceding bit (i.e., the bit that occurred in time just before the current bit) in the high-speed serial data signal.

The output signal of delay element 60-1 is applied to (1) scaler circuitry 70-1 and (2) delay circuit element 60-2. Delay element 60-2 is another instance of circuitry like 60-1. Accordingly, delay element 60-2 delays the signal applied to it by another sampler 50 sampling time interval. As a general matter, scaler circuitry 70-1 is circuitry for multiplying the signal applied to it from element 60-1 by a scale factor or "tap coefficient" C1. Much more attention will be devoted to circuitry like 70-1 (and 70-2, 70-3, etc.) and to scale factors like C1 (and C2, C3, etc.) later in this specification. But for the moment it will be sufficient to note (1) that each of these scale factors is preferably controllably variable on an individual basis, and (2) that each scale factor scales (e.g., multiplies, amplifies/attenuates) the signal applied to it from the output of the associated delay element 60 by that scale factor in order to provide a respective scaler output signal for application to combiner 40. Each scale factor is generally a number having an absolute value less than 1.

For completeness we continue by expressly noting that the output signal of delay element 60-2 is applied to (1) scaler 70-2 and (2) delay circuit 60-3. Scaler 70-2 is another instance of circuitry like 70-1, although scaler 70-2 applies its own scale factor C2.

Similarly, delay circuitry 60-3 is another instance of circuitry like 60-1 and 60-2. Thus circuitry 60-3 delays the signal it receives by yet another time interval equal to the time interval between successive samples taken by sampler 50. The output signal of delay element 60-3 is applied to (1) yet another scaler circuit 70-3 (using scale factor C3), and (2) yet another instance of delay circuitry 60 (not shown). The chain of serially connected delay elements 60 may continue for as long as desired. The node between each delay element 60 and the next successive delay element in this series or chain may be referred to as a "tap" of the DFE circuitry. The signal at each tap is applied to a respective scaler circuit 70, which "weights" or "scales" the applied tap signal by the "tap coefficient" C of that tap and applies the resulting weighted feedback signal to combiner 40 for use by the combiner as described earlier herein. Appropriate selection of coefficients C allows DFE 10 to remove from each successive portion of the received high-speed serial data signal artifacts of previous portions of that signal that are "degrading" the current portion. Thus, to repeat some things that were said earlier, DFE 10 is a non-linear equalizer capable of compensating for post-cursor inter-symbol interference and channel reflection. DFE 10 detects the previous bits and compensates their effects on the current bit by subtracting/adding a weighted value from the current bit based on previous data. To successfully eliminate all the post-cursor ISI, the weighted coefficients C1, C2, C3, etc. of the different taps need to be determined correctly.

With regard to the problem of correctly determining the weighting coefficients C of the taps of DFE circuitry like 10, when the serial data bit rates are relatively low and the DFE only has one or two taps, the tap coefficients can be determined relatively easily by sweeping all of the available C settings and finding the one (or small set of ones) that gives the best bit-error rates (e.g., at the output of the above-mentioned downstream CDR circuitry). However, as the bandwidth requirements of high-speed serial links increase (due, for example, to higher serial data bit rates) and the number of taps required for successfully removing the post-cursor ISI increases (e.g., to five taps as an example), having an "adaptation engine" (circuitry) that automatically adjusts the tap weights can greatly increase the usability of the equalizer. (A five-tap DFE circuit 10 includes five serially connected delay elements 60-1 through 60-5, and five scalers 70-1 through 70-5 (employing tap coefficients C1-C5, respectively). In addition, with such an adaptation engine, continual adaptation of tap weights C to track possible changes in high-speed link communication channel behavior over time can be achieved.

It may be preferred that the above-mentioned adaptive operation of a DFE like 10 takes place automatically (e.g., without involvement or significant involvement of any human user of the system including the DFE). Such autonomous operation may therefore sometimes be referred to as automatic equalization or the like. A user may occasionally initiate such adaptive equalization (e.g., by resetting a system), but the DFE preferably determines its own best or optimal coefficient values C in order to provide the best equalization for the incoming high-speed serial data signal. Words like "adaptation" as applied herein to DFE like 10 will be understood to refer to such automatic determination of coefficient values C that give desirably good equalization of the incoming signal.

In order to perform adaptation, the coefficient C for each tap in a DFE like 10 can be determined using a least-mean-square ("LMS") technique. The LMS method may include a feedback loop that computes an estimation error of the output of a filter with a desired response and automatically adjusts one or more parameters of the filter according to the error. This method may employ an iterative procedure that makes successive correction to the weight factors (like coefficients C) in the direction of the negative of the gradient vector, which eventually leads to the minimum mean square error. The coefficient of each tap using the LMS technique is given by the equation $$c_k[n+1]=c_k[n]+ue[n]y_d[n-k],$$

where n is the discrete time index, $c_k[n]$ is the tap weight for the $k^{th}$ tap for index n, e[n] is the error (e.g., the amount by which the output signal of the filter/equalizer differs from what it should be for index n), and $y_d[n-k]$ is the $k^{th}$ previous data. Step size u controls convergence speed and steady-state variance of the coefficients. The immediately above equation may be referred to as "Equation 1."

A possible problem with the above-mentioned LMS technique is that its complexity increases with the number of feedback taps. It can also be difficult to implement.

To simplify the circuitry required, a variant of the LMS technique, which may be called sign-sign LMS, can be used. Sign-sign LMS uses (1) the algebraic sign of the error (i.e., whether the error has a positive value and therefore a positive algebraic sign (i.e., +), or a negative value and therefore a negative algebraic sign (i.e., −)), and (2) the algebraic sign of the data (i.e., whether a data value (like $y_d[n-k]$) is positive and therefore has a positive algebraic sign (+), or is negative and therefore has a negative algebraic sign (−)) in performing the weight updates. This is done instead of using the full error and data values.

The sign-sign LMS method tends to have greater convergence speed but greater steady-state error than the full LMS method. However, the sign-sign LMS method can greatly simplify the hardware (circuitry) required for implementation of automatic adaptation of a DFE like 10, and the required computations can be done faster.

In accordance with the sign-sign LMS method, each updated tap coefficient is given by $$c_k[n+1]=c_k[n]+usgn(e[n])sgn(y_d[n-k]),$$

where sgn( ) is a mathematical (algebraic) "operator" meaning "use the algebraic sign of the parameter or variable inside the parentheses." The other symbols in the immediately above equation have the same meanings as in the earlier equation. The immediately above equation may be referred to as "Equation 2."

Based on the above sign-sign LMS technique equation, this adaptation method requires the generation of an error sign for each bit and circuitry to generate products of the error sign and data stream signs. The error e(n) can be determined as the difference between the slicer (sampler 50) output $y_d(n)$ and the input y(n) to the slicer, as per the following "Equation 3:"

$$e(n)=y_d(n)-y(n).$$

Figure 2:
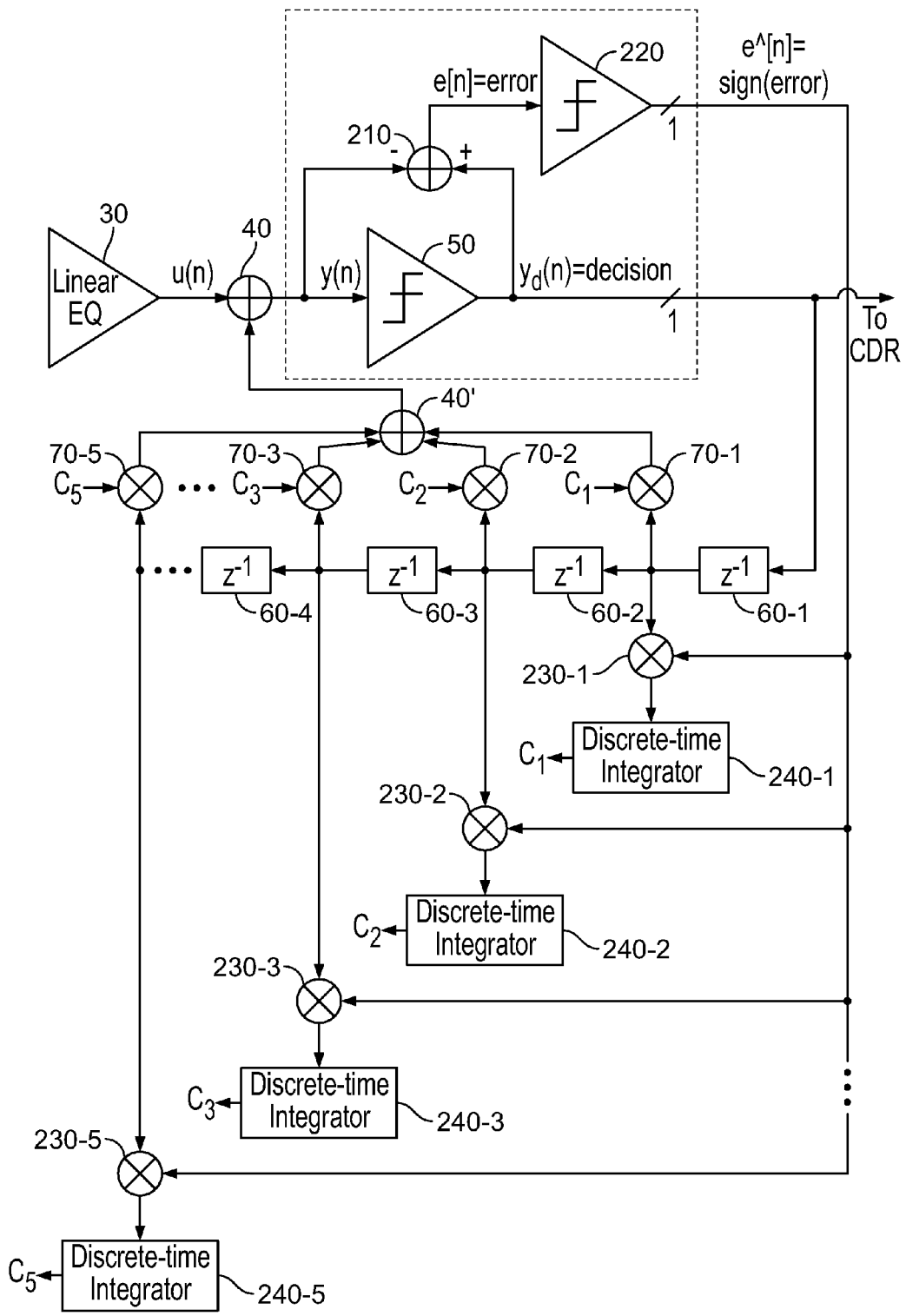
FIG. 2 is a simplified schematic block diagram of an illustrative embodiment of DFE circuitry in accordance with certain possible aspects of the disclosure.

FIG. 2 shows (at least in representative part) an illustrative embodiment of circuitry in accordance with this disclosure for performing the Equation 3 error determination, and then further processing that result in a manner that is at least somewhat like earlier-mentioned Equation 2 to automatically (adaptively) provide scaler coefficients for use in the scaler circuit elements like 70 in DFE circuitry like 10. Elements in FIG. 2 that are at least generally similar to elements in FIG. 1 have the same reference numbers in both FIGS. Elements in FIG. 2 that are different from anything shown in FIG. 1 have three-digit reference numbers (in a 200 series) in FIG. 2. Note that in FIG. 2 combiner 40 is broken (subdivided) into two parts 40 and 40', but the combination of those two FIG. 2 elements is effectively the same as the single element 40 in FIG. 1. Also note that, in general, throughout this disclosure (including the FIGS.) any variable or reference symbol identified by a letter is the same or a related variable or reference, whether the letter appears in a particular instance as an upper case (capital) letter or a lower case (non-capital) letter. Also throughout this disclosure and in the accompanying FIGS. square brackets and parentheses may be used interchangeably, with no significance being attached to which type of punctuation marks are used in any particular instance.

As shown in FIG. 2, combiner circuit element 210 subtracts the input of sampler 50 (that input now being identified as y(n)) from the output of the sampler (that output now being identified as $y_d(n)$, where d denotes that a sampling "decision" has been made by sampler 50). Note that (as before) the index value n in these and other variables indicates operations that take place (and parameter values that are meaningful or significant for present purposes) at discrete time intervals (i.e., the regularly spaced time intervals at which sampler 50 performs a sampling operation on its input signal y(n)).

The output signal (e[n]) of combiner 210 is an error signal, which is applied to quantizer circuit element 220. Quantizer 220 quantizes the error signal to only one bit at any given sample time n to simplify the adaptation circuitry downstream from the quantizer. For example, if the value of the error signal e[n] is algebraically positive (+), the one bit output by quantizer 220 may have binary value 1. If the value of the error signal e[n] is algebraically negative (−), the one bit output by quantizer 220 may have binary value 0. (As with "polarity" generally throughout this disclosure, this convention can be reversed, if desired.) Thus the output signal ê[n] is one (single) bit equal to (indicative of) the algebraic sign of error signal e[n].

The quantized error signal ê[n] is applied to one input terminal of each of a plurality of multiplier circuits 230-1, 230-2, 230-3, etc. There is one such multiplier 230 for each tap in the DFE circuit. As in FIG. 1, each tap is at the output of a respective one of the delay circuit elements 60 in the chain (series) of such elements. The other input to each multiplier 230 is the output signal of the delay circuit element 60 associated with that tap. Thus (for example) the output signal of the first delay circuit element 60-1 is the second input to multiplier 230-1. As another example, the output signal of the second delay circuit element 60-2 is the second input to multiplier 230-2. As discussed earlier in connection with FIG. 1, the output signal of each delay element 60 is also a single, one-bit-only signal.

Each multiplier 230 multiplies the two signals applied to it, and applies the resulting product signal (again a single-bit or one-bit-only signal) to a respective one of discrete-time integrators 240-1, 240-2, 240-3, etc. (An illustrative embodiment of a representative one of integrators 240 is shown in more detail in FIG. 4 and described later in this specification.) For example, the product output by multiplier 230-1 is applied to discrete-time integrator 240-1; the product output by multiplier 230-2 is applied to discrete-time integrator 240-2; and so on. Each integrator 240 operates on the signals applied to it (e.g., as shown and described in more detail later in this specification) to produce a corresponding one of DFE tap coefficients C (or at least a number C for controlling selection of the corresponding one of DFE tap coefficients C). For example, the $C_1$ output signals of integrator 240-1 may be used to control selection of the tap coefficient $C_1$ used in multiplier circuit element 70-1. Multiplier 70-1 multiplies the output signal of delay element 60-1 by tap coefficient $C_1$ to produce one of the inputs to combiner 40'/40. As another example, the $C_2$ output signals of integrator 240-2 may be used to control selection of the tap coefficient $C_2$ used in multiplier 70-2. This multiplier multiplies the output signal of delay element 60-2 by tap coefficient $C_2$ to produce another of the inputs to combiner 40'/40.

From the foregoing it will be seen that each tap coefficient C is adapted using a discrete-time integrator 240. These integrators 240 (and their related circuitry) implement a sign-error least-mean-square ("LMS") technique for automatic adaptation of the tap coefficients C and hence the DFE (like 10) using these coefficients. (For each tap in the DFE there is a corresponding integrator 240.) Using integrators 240 can slow down the coefficient updating process so as not to cause possible instability in operation of the DFE circuitry. In effect, integrators 240 perform a low-pass filtering operation on the product signals applied to them from multipliers 230.

The actual (functional) connection from each C output in FIG. 2 to the corresponding C input in that FIG. is not drawn in the FIG. to avoid over-complicating the drawing with an excessive number of lines that cross over one another. But it will be understood that these connections are in fact present (e.g., that integrator 240-1 output $C_1$ is at least functionally connected to multiplier 70-1 input $C_1$; that integrator output $C_2$ is at least functionally connected to multiplier 70-2 input $C_2$; etc.). Again, it is expressly noted that each C output in FIG. 2 may not be the actual scale factor C that is used by the corresponding scaler circuit 70. However, each scale factor is at least based on (e.g., selected from a range of possible scale factor values based on) the value of the corresponding C output in FIG. 2. Each C output in FIG. 2 may be a multi-digit binary number, the value of which determines which of several available values for the corresponding scaler 70 factor will be selected. The "step size" u referred to earlier may be embodied (for example) in the amount by which numerically adjacent ones of these selectable scale factor values differ from one another. This can also be influenced by how many different values each integrator 240 output C can have (e.g., whether each such integrator 240 output is a 3-bit binary number, a 4-bit binary number, etc.) Outputs with fewer bits tend to result is coarser (larger) step size u; outputs with more bits can support finer (smaller) step size u.

Figure 6:
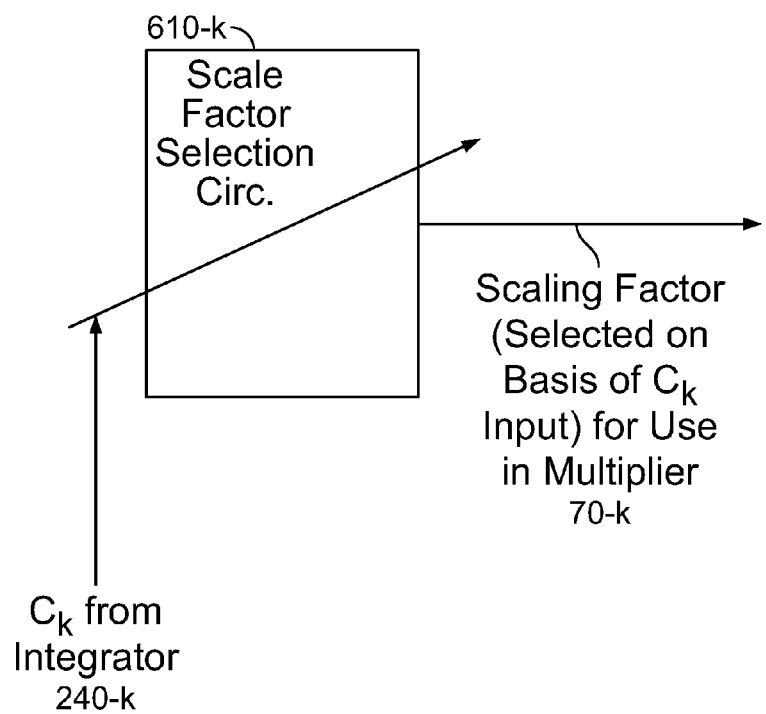
FIG. 6 is a simplified schematic block diagram of an illustrative embodiment of representative circuitry that may be included in circuitry like that shown in FIG. 2 in accordance with certain possible further aspects of the disclosure.

An illustrative embodiment of circuitry such as is referred to in the immediately preceding paragraph is shown in FIG. 6 and further described later in this specification.

Figures 3, 4:
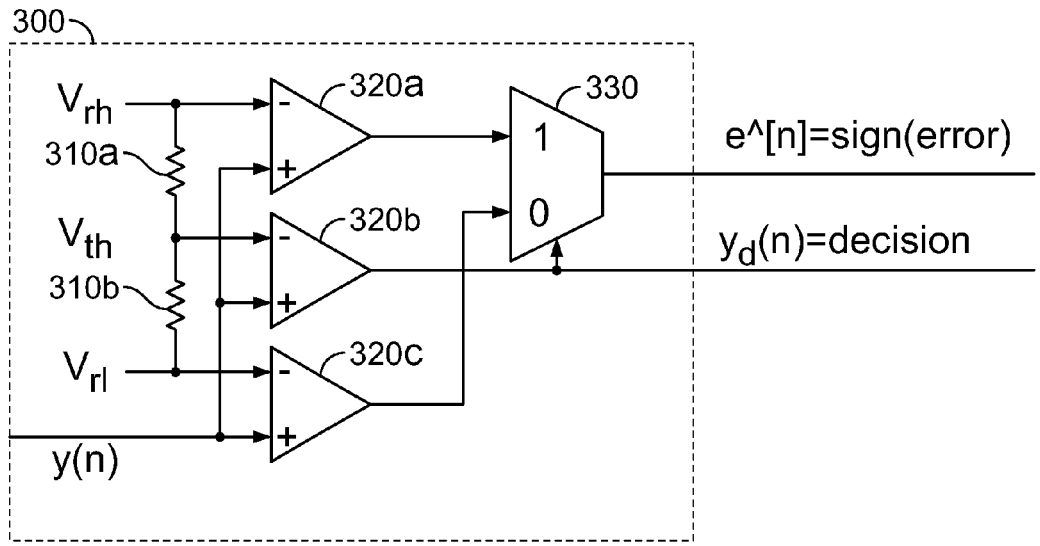
FIG. 3 is a simplified schematic block diagram of an illustrative embodiment of a portion of the FIG. 2 circuitry in accordance with certain further possible aspects of the disclosure.
FIG. 4 is a table showing the values of various signals in the FIG. 3 circuitry under various operating conditions of the circuitry.

An illustrative embodiment of a possible construction of error generator circuitry 300 (like the circuitry shown inside the dotted rectangle in FIG. 2) is shown in more detail in FIG. 3. As FIG. 3 shows, error generator 300 can be implemented by three comparator circuitries 320a, 320b, and 320c, and multiplexer ("mux") circuitry 330. A voltage dividing resistor network 310a/b may also be employed.

In circuitry 300, Vrh is a source of relatively high reference voltage, and Vrl is a source of relatively low reference voltage. The term "relatively" is used here primarily to indicate that the voltage of Vrh is higher than the voltage of Vrl. Thus voltage Vrh is "high" or "relatively high" as compared to (i.e., relative to) voltage Vrl (which means that voltage Vrl is "low" or "relatively low" as compared to (i.e., relative to) voltage Vrh). Resistors 310a and 310b are connected in series with one another between Vrh and Vrl. A node (labelled Vth) is provided between resistors 310. Accordingly, the voltage at node Vth (also referred to as voltage Vth) has value between (intermediate) voltages Vrh and Vrl. The amounts by which Vth differs from Vrh and Vrl is determined by the relative resistances of resistors 310a and 310b. For example, if these resistances are equal, Vth is midway between Vrh and Vrl. If resistance 310a is less than resistance 310b, then Vth is closer to Vrh than to Vrl. If resistance 310a is greater than resistance 310b, then Vth is farther from Vrh than from Vrl.

The serial data input signal y(n) is applied to the positive input terminal of each of comparators 320a, 320b, and 320c. Vrh is applied to the negative input terminal of comparator 320a. Vth is applied to the negative input terminal of comparator 320b. Vrl is applied to the negative input terminal of comparator 320c.

Comparator 320b determines the polarity ($y_d(n)$) of serial data input signal y(n). This is done by comparator 320b comparing y(n) to Vth. For example, if comparator 320b finds that the voltage of y(n) is greater than Vth, comparator 320b may output $y_d(n)$ equal to binary 1. Conversely, if comparator 320b finds that the voltage of y(n) is less than Vth, comparator 320b may output $y_d(n)$ equal to binary 0. (Like other polarity conventions throughout this disclosure, this convention may be reversed if desired.)

Each of comparators 320a and 320b generates a respective candidate error sign signal. For example, if comparator 320a finds that the voltage of y(n) is greater than Vrh, comparator 320 may produce a candidate error sign signal equal to binary 1. (This condition will also mean that comparator 320c produces a candidate error sign signal equal to binary 1.) On the other hand, if comparator 320a finds that voltage y(n) is less than Vrh, comparator 320a may produce a candidate error sign signal equal to binary 0. (This condition may result in comparator 320c producing a candidate error sign signal of either binary 1 or binary 0, depending on whether y(n) is above or below Vrl.) As a final example, if comparator 320c finds that voltage y(n) is less than Vrl, comparator 320c may produce a candidate error sign signal equal to binary 0. (This condition will also mean that comparator 320a produces a candidate error sign signal equal to binary 0.)

The candidate error sign signal produced by comparator 320a is applied to one of the selectable input terminals of mux 330. The candidate error sign signal produced by comparator 320c is applied to the other selectable input terminal of mux 330. The $y_d(n)$ output signal of comparator 320b is applied to the selection control input terminal of mux 330. Thus the binary value of the $y_d(n)$ signal determines which of its two selectable inputs mux 330 selects to be its final error sign output signal eˆ[n]. In particular, FIG. 3 shows that if $y_d(n)$ is binary 1, mux 330 selects the output of comparator 320a as the final error sign signal eˆ[n], whereas if $y_d(n)$ is binary 0, mux 330 selects the output of comparator 320c as the final error sign signal eˆ[n]. Thus the final error sign eˆ[n] is selected by the decision bit $y_d(n)$.

FIG. 4 is a truth table summarizing the operation of the FIG. 3 circuitry under all possible input signal conditions. For example, line 1 in FIG. 4 shows that when y(n) is greater than Vrh, the outputs of all of comparators 320 are 1 and the sign error output signal is also 1. Line 4 in FIG. 4 shows that when y(n) is less than Vrl, all of the just-mentioned outputs are 0. Line 2 in FIG. 4 shows that when y(n) is between Vrh and Vth, the output of comparator 320a is 0, but the outputs of comparators 320c and 320b are 1. This leads to a sign error output signal of 0. Line 3 of FIG. 4 shows that when y(n) is between Vth and Vrl, the outputs of comparator 320a and 320b are 0, but the output of comparator 320c is 1. This causes the sign error output signal to be 1.

From the foregoing, it will be appreciated that the levels (voltage values) of Vrh and Vrl determine the final values that it is desired to have the DFE restore the data to (i.e., in signal $y_d(n)$). Also from the foregoing it will be appreciated that the voltage difference between Vrh and Vrl (i.e., Vrh-Vrl) is the approximate vertical eye opening of the output(s) of the DFE. The adaptation engine (circuitry) can converge more easily for a smaller Vrh-Vrl, but that tends to reduce the vertical eye opening of the DFE outputs. On the other hand, having a larger Vrh-Vrl makes it harder for the adaptation engine to converge. (The "eye" of a data signal results from the concept of super-imposing many unit intervals of the signal in a single time period corresponding to one unit interval. The interior area of such a super-position through which no portion of the data signal passes is the "open" interior of the eye of the data signal. In general, the larger (more open) the eye, the more easily and accurately data information can be recovered from the signal (e.g., by downstream clock and data recovery circuitry).)

Figure 5:
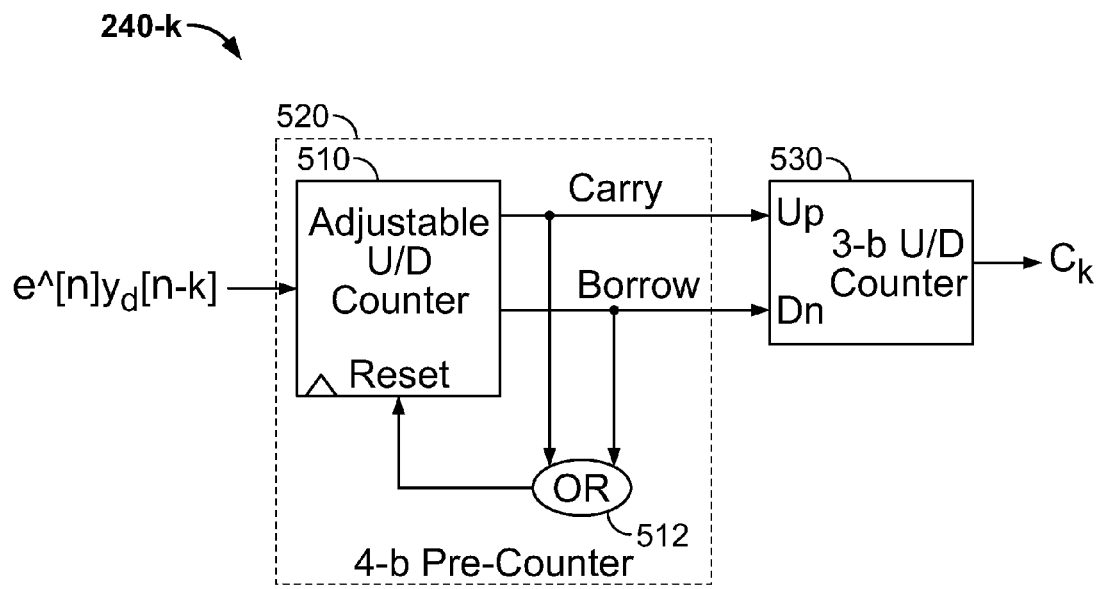
FIG. 5 is a simplified schematic block diagram of an illustrative embodiment of a representative one of other portions of the FIG. 2 circuitry in accordance with certain possible aspects of the disclosure.

An illustrative embodiment of a representative one of discrete-time integrators 240 is shown in more detail in FIG. 5. Immediately upstream from each discrete time integrator, the associated multiplier 230 multiplies the current error sign signal by the appropriately delayed previous $y_d(n)$ data signal value. This is shown in FIG. 5, wherein the representative $k^{th}$ discrete-time integrator 240-$k$ (where k may have any non-zero, positive, integer value such as 1, 2, 3, 4, etc.) is shown as having the input (from the associated multiplier 230-$k$) eˆ[n] $y_d$[n−k].

In the illustrative embodiment shown in FIG. 5, the discrete-time integrators are implemented by up/down ("U/D") counter circuits. Depending on the polarity of the error and the data, four-bit ("4-b") pre-counter 520 will increment (increase by 1) or decrement (decrease by 1) its current count value or stored contents. In the event that adjustable up/down counter 510 (in pre-counter 520) overflows, it outputs a binary 1 carry output signal, causing the associated three-bit ("3-bit") up/down ("U/D") coefficient counter 530 to increment. Conversely, in the event that counter 510 underflows, it outputs a binary 1 borrow signal. This causes the associated counter 530 to decrement. Any overflow or underflow of counter 510 causes OR gate 512 to output a binary 1 signal, which resets counter 510 to a count value at or near the middle of its range of possible count values. This prevents frequent sequences of carry=1 or borrow=1. Although shown as having four bits, pre-counter 520 may have an adjustable number of bits as an aid to controlling convergence speed. The count output by coefficient counter 530 may be used to control the coefficient $C_k$ of the associated tap weighting circuit 70-$k$.

FIG. 6 is a simplified schematic block diagram of an illustrative embodiment of a representative instance of circuitry 610-$k$ that may be used to convert output signals from a representative instance of integrator circuitry 240 in FIG. 2 to an actual scaling (multiplication, amplification/attenuation) factor or coefficient used by a respective instance of circuitry 70 in FIG. 2. For example, the outputs $C_k$ of integrator 240-$k$ may be a multi-bit digital value or word. Circuitry 610-$k$ may convert such a digital value to an analog control value (scale or scaling factor) for controlling the amount by which the associated circuitry 70-$k$ amplifies or attenuates the delayed data signal value it receives from the associated delay circuit element 60-$k$. Thus circuitry 610-$k$ may be digital to analog converter circuitry, memory circuitry for looking up and outputting any one of several previously stored output signal values based on using the $C_k$ signals from integrator 240-$k$ as address signals applied to the memory, or the like. The scaling factor output(s) of circuitry 610-$k$ are also sometimes referred to in this disclosure as Ck, $C_k$, or the like; but it will be understood that although the circuit 610 output(s) $C_k$ are based on the circuit 610 input(s) $C_k$, these input and output values may be different from one another, with circuitry 610 providing the conversion or translation from the input values regime to the output values regime.

In some respects recapitulating and extending the foregoing, certain possible aspects of this disclosure relate to decision feedback equalizer ("DFE") circuitry (e.g., like 10) for operating on a serial data signal (e.g., like 20, Vin, or u(n)). Such DFE circuitry may include circuitry (e.g., 60-1, 60-2, 60-3, etc.) for delaying a digitized data output signal (e.g., "to CDR" or $y_d(n)$) of the DFE circuitry by passing that signal successively through a plurality of delay circuit elements (e.g., 60-1, 60-2, 60-3, etc.) so that at any given time each delay circuit element outputs one respective previous bit from the serial data output signal of the DFE circuitry. The DFE circuitry may further include circuitry (e.g., 70-1, 70-2, 70-3, etc.) for applying a respective scaling (or scale) factor (e.g., C1, C2, C3, etc. (or $C_1$, $C_2$, $C_3$, etc.)) to an output signal of each of the delay circuit elements to produce a respective feedback signal. The DFE circuitry may still further include circuitry (e.g., 40 or 40/40') for combining the serial data signal with the feedback signals to produce a source signal (e.g., V or y(n)) for the output signal of the DFE circuitry. The DFE circuitry may yet further include circuitry (e.g., 210, 220, 230-1, 230-2, etc., 240-1, 240-2, etc.) for determining the scaling factor for each of the feedback signals based on (1) an algebraic sign (e.g., eˆ[n] or sign(error)) of error in the output signal of the DFE circuitry, and (2) the output signal of the respective delay circuit element.

In circuitry of the kind recapitulated above, the circuitry for determining may include circuitry (e.g., 230-1, 230-2, etc.) for multiplying the algebraic sign of the error (e.g., eˆ[n]) by the output signal of the respective delay circuit element (e.g., 60-1, 60-2, etc.) to produce a product signal for use in determining the respective scaling factor (e.g., $C_1$, $C_2$, etc.).

In circuitry of the kind recapitulated above, the circuitry for determining may further include circuitry (e.g., 240-1, 240-2, etc.) for integrating over time the product signal for each respective scaling factor to produce a time-integrated signal (e.g., $C_1$, $C_2$, etc. output of 240-1, 240-2, etc.) for use in determining each respective scaling factor.

In circuitry of the kind recapitulated above, the circuitry for determining may still further include circuitry (e.g., 610-$k$) for basing a value of each scaling factor (e.g., "scaling factor . . . for use in multiplier 70-$k$" output of 610-$k$) on the time-integrated signal (e.g., "$C_k$ from integrator 240-$k$" input to 610-$k$) for that scaling factor.

In circuitry as recapitulated above, the circuitry for determining may include circuitry (e.g., 50) for digitizing the source signal (e.g., y(n)) to produce the output signal (e.g., $y_d$(n)) of the DFE circuitry.

In circuitry of the kind recapitulated above, the circuitry for determining may further include circuitry (e.g., 210) for comparing the output signal of the DFE circuitry to the source signal to produce an error signal (e.g., e[n] or error).

In circuitry of the kind recapitulated above, the circuitry for determining may still further include further circuitry (e.g., 220) for digitizing the error signal to determine the algebraic sign (e.g., eˆ[n]) of the error signal.

In some respects further (or alternatively) recapitulating and extending the foregoing, certain possible aspects of this disclosure relate to methods of operating decision feedback equalizer ("DFE") circuitry (e.g., 10). Such a method may include producing a plurality of differently delayed versions (e.g., output signals of 60-1, 60-2, 60-3, etc.) of an output signal (e.g., ($y_d$(n)) of the DFE circuitry. Such a method may further include determining an algebraic sign (e.g., eˆ[n]) of an error value (e.g., e[n]) of the output signal of the DFE circuitry. Such a method may still further include operating on each of the delayed versions with a signal (e.g., eˆ[n]) to produce a respective further signal (e.g., output signal of multiplier 230-1, 230-2, 230-3, etc.) associated with each of the delayed versions. Such a method may yet further include using the further signal associated with each of the delayed versions to determine a coefficient (e.g., $C_1$, $C_2$, $C_3$, etc.) for weighting each respective delayed version (e.g., in a respective one of multipliers 70-1, 70-2, 70-3, etc.) in a combination (e.g., produced by 40 or 40/40') with a serial data input signal (e.g., u(n)), from which combination (e.g., y(n)) the output signal (e.g., $y_d$(n)) of the DFE circuitry is produced.

In a method as recapitulated above the producing may include delaying the output signal of the DFE circuitry (e.g., $y_d$(n)) by each of a plurality of –1 successive unit intervals (e.g., $z^{-1}$, or 60-1, 60-2, 60-3, etc.) of the serial data input signal (e.g., u(n)), each of the delayed versions being an output signal of a respective one of the unit intervals of delay (e.g., 60-1, 60-2, 60-3, etc.).

A method as recapitulated above may further include comparing the combination (e.g., y(n)) to a threshold voltage (e.g., $V_{th}$) to produce the output signal of the DFE circuitry (e.g., $y_d$(n)) having a first binary value (e.g., binary 1) if the combination is greater than the threshold value and having a second binary value (e.g., binary 0) if the combination is less than the threshold value.

In a method as recapitulated above, the determining may include comparing the output signal of the DFE circuitry (e.g., $y_d$(n)) to the combination (e.g., y(n)) to produce the error value (e.g., e[n]).

In a method as recapitulated above, the determining may further include determining whether the error value (e.g., e[n]) is algebraically greater than a range of acceptable error values (e.g., the range from $V_{rl}$ to $V_{rh}$), and if so, using a first binary value (e.g., binary 1) to indicate the algebraic sign (e.g., eˆ[n]) of the error value; and if the error value (e.g., e[n]) is algebraically less than the range of acceptable error values (e.g., the range from $V_{rl}$ to $V_{th}$), then using a second binary value (e.g., binary 0) to indicate the algebraic sign (e.g., eˆ[n]) of the error signal.

In a method as recapitulated above, the operating may include multiplying each of the delayed versions (e.g., output signals of 60-1, 60-2, 60-3, etc.) by the signal (e.g., eˆ[n]) indicative of the algebraic sign.

In a method as recapitulated above, the using may include multiplying each delayed version (e.g., output signal of 60-1, 60-2, 60-3, etc.) by the coefficient (e.g., $C_1$, $C_2$, $C_3$, etc.) determined for weighting that respective delayed version.

In a method as recapitulated above the using may include low-pass filtering (e.g., using discrete-time integrator 240-1, 240-2, 240-3, etc., each constructed, e.g., as shown in FIG. 5) the further signal (e.g., output signal of respective multiplier 230-1, 230-2, 230-3, etc.) associated with each of the delayed versions to produce a filtered signal (e.g., $C_1$, $C_2$, $C_3$, etc., output signals of elements 240) for use in determining the coefficient (e.g., $C_1$, $C_2$, $C_3$, etc. used in multipliers 70-1, 70-2, 70-3, etc.) for weighting each respective delayed version.

In some respects still further (or alternatively) recapitulating and extending the foregoing, certain possible aspects of this disclosure relate to decision feedback equalizer ("DFE") circuitry (e.g., 10) for operating on a serial data signal (e.g., u(n)). Such DFE circuitry may include combiner circuitry (e.g., 40 or 40/40') for combining the serial data signal with a plurality of feedback signals (e.g., output signals of multipliers 70-1, 70-2, 70-3, etc.) to produce an intermediate signal (e.g., y(n)). The DFE circuitry may further include first, second, and third circuitries (e.g., 320a, 320c, and 320b, respectively) for respectively comparing the intermediate signal to (1) a first relatively high reference voltage (e.g., $V_{rh}$), (2) a second relatively low reference voltage (e.g., $V_{rl}$), and (3) a threshold voltage (e.g., $V_{th}$) that is intermediate the first and second reference voltages, an output signal (e.g., $y_d$(n)) of the third circuitry being a binary output signal of the DFE circuitry and also being used (e.g., in 330) to control selection of which one of the binary output signals of the first and second circuitries is used as an error signal (e.g., eˆ[n]). The DFE circuitry may still further include circuitry (e.g., 60-1, 60-2, 60-3, etc.) for delaying the output signal of the DFE circuitry by progressively greater amounts of time to produce a plurality of delayed signals, each of which is delayed by a respective one of the amounts. The DFE circuitry may yet further include circuitry (e.g., 230-1, 230-2, 230-3, etc.) for multiplying each of the delayed signals by the error signal to produce a plurality of product signals, each of which is associated with a respective one of the delayed signals. The DFE circuitry may still further include circuitry (e.g., 240-1, 240-2, 240-3, etc.) for using the product signal associated with each of the delayed signals to determine a weighting coefficient (e.g., $C_1$, $C_2$, $C_3$, etc.) for the associated delayed signal. The DFE circuitry may yet further include circuitry (e.g., 70-1, 70-2, 70-3, etc.) for weighting each of the delayed signals by the weighting coefficient associated with that delayed signal to produce a respective one of the feedback signals.

In circuitry as recapitulated above, the combiner circuitry may perform an analog combining of the serial data signal and the feedback signals.

In circuitry as recapitulated above, at any given time, the output signal (e.g., $y_d$(n)) represents only a single bit of data information (e.g., as indicated by the slash across the $y_d$(n) lead in FIG. 2 and the "1" associated with that slash) and the error signal (e.g., eˆ[n]) also represents only a single bit of error information (e.g., as indicated by the slash across the e^[n] lead in FIG. 2 and the "1" associated with that slash).

In circuitry as recapitulated above, each of the progressively greater amounts of time may be a respective different integer multiple of a time duration of one data bit in the serial data signal (e.g., 1 unit interval after 60-1, 2 unit intervals after 60-1 and 60-2, 3 unit intervals after 60-1, 60-2, and 60-3, etc.).

In circuitry as recapitulated above, the circuitry for multiplying each of the delayed signals by the error signal may have multiplication capability limited to multiplying only two bits together (e.g., each multiplier 230 may be a one-bit multiplier for multiplying one delayed bit (i.e., a delayed $y_d(n)$ bit) by one error sign bit e^[n]).

In circuitry as recapitulated above, the circuitry for using may include circuitry (e.g., 240-1, 240-2, 240-3, etc.) for discrete-time integration of successive product signals associated with each of the delayed signals to produce an integrated signal (e.g., $C_1$, $C_2$, $C_3$, etc., output signals of elements 240) associated with each of the delayed signals. The circuitry for using may further include circuitry (e.g., as in FIG. 6) for determining the weighting coefficient (e.g., "scaling factor . . . for use in multiplier 70-$k$" output by circuitry 610-$k$) for the associated delayed signal from the integrated signal (e.g., "$C_k$ from integrator 240-$k$" input to circuitry 610-$k$) associated with that delayed signal.

In circuitry as recapitulated above, the weighting coefficient (e.g., $C_1$, $C_2$, $C_3$, etc.) associated with each of the delayed signals may be an analog signal parameter.

It will be understood that the foregoing is only illustrative of the principles of this disclosure and that various modifications can be made by those skilled in the art without departing from the scope and spirit of the disclosure. For example, DFE circuitry in accordance with this disclosure may include any number of taps. As another example, other constructions than the one shown in FIG. 5 may be used for the discrete-time integrators 240. It will be appreciated that circuit elements 240 are effectively low-pass filters operating on signal values (i.e., multiplier 230 outputs) that are produced periodically or at discrete times (i.e., once per unit interval of the serial data signal being processed by the DFE circuitry).

What is claimed is:

1. Decision feedback equalizer ("DFE") circuitry for operating on a serial data signal comprising:
   circuitry for delaying a digitized, serial data output signal of the DFE circuitry by passing that signal successively through a plurality of respective delay circuit elements so that, at any given time, each respective delay circuit element outputs one respective previous bit from the serial data output signal of the DFE circuitry;
   circuitry for applying a respective scaling factor to a respective output signal of each of the respective delay circuit elements to produce a respective feedback signal;
   circuitry for combining the serial data signal with the respective feedback signals to produce a source signal for the output signal of the DFE circuitry; and
   circuitry for determining the respective scaling factor for each of the respective feedback signals based on (1) an algebraic sign of error in the output signal of the DFE circuitry and (2) the output signal of the respective delay circuit element, including circuitry for integrating over time a product signal for each of the respective scaling factors to produce a time-integrated signal for use in determining each of the respective scaling factors.

2. The circuitry defined in claim 1 wherein the circuitry for determining further comprises:
   circuitry for multiplying the algebraic sign of the error by the output signal of the respective delay circuit element to produce the product signal for use in determining the respective scaling factor.

3. The circuitry defined in claim 1 wherein the circuitry for determining still further comprises:
   circuitry for basing a value of each of the respective scaling factors on the time-integrated signal for that one of the respective scaling factors.

4. The circuitry defined in claim 1 wherein the circuitry for determining comprises:
   circuitry for digitizing the source signal to produce the output signal of the DFE circuitry.

5. The circuitry defined in claim 4 wherein the circuitry for determining further comprises:
   circuitry for comparing the output signal of the DFE circuitry to the source signal to produce an error signal.

6. The circuitry defined in claim 5 wherein the circuitry for determining still further comprises:
   further circuitry for digitizing the error signal to determine the algebraic sign of the error signal.

7. A method of operating decision feedback equalizer ("DFE") circuitry comprising:
   producing a plurality of differently delayed versions of an output signal of the DFE circuitry;
   determining an algebraic sign of an error value of the output signal of the DFE circuitry;
   operating on each of the differently delayed versions with a signal indicative of the algebraic sign to produce a respective further signal associated with each of the differently delayed versions; and
   using the respective further signal associated with each of the differently delayed versions to determine a coefficient for weighting each respective one of the differently delayed versions in a combination with a serial data input signal, from which combination the output signal of the DFE circuitry is produced, including low-pass filtering the respective further signal associated with each of the differently delayed versions to produce a filtered signal for use in determining the coefficient for weighting each respective one of the differently delayed versions.

8. The method defined in claim 7 wherein the producing comprises:
   delaying the output signal of the DFE circuitry by each of a plurality of successive unit intervals of the serial data input signal, each of the differently delayed versions being an output signal of a respective one of the unit intervals of delay.

9. The method defined in claim 7 further comprising:
   comparing the combination to a threshold voltage to produce the output signal of the DFE circuitry having a first binary value if the combination is greater than the threshold voltage and having a second binary value if the combination is less than the threshold value.

10. The method defined in claim 9 wherein the determining comprises:
    comparing the output signal of the DFE circuitry to the combination to produce the error value.

11. The method defined in claim 10 wherein the determining further comprises:
    determining whether the error value is algebraically greater than a range of acceptable error values, and if so, using a first binary value to indicate the algebraic sign of the error value; and if the error value is algebraically less than the range of acceptable error values, then using a second binary value to indicate the algebraic sign of the error signal.

12. The method defined in claim 7 wherein the operating comprises:
multiplying each of the differently delayed versions by the signal indicative of the algebraic sign.

13. The method defined in claim 7 wherein the using comprises:
multiplying each of the differently delayed versions by the coefficient determined for weighting that respective one of the differently delayed versions.

14. Decision feedback equalizer ("DFE") circuitry for operating on a serial data signal comprising:
combiner circuitry for combining the serial data signal with a plurality of feedback signals to produce an intermediate signal;
first, second, and third circuitries for respectively comparing the intermediate signal to (1) a first relatively high reference voltage, (2) a second relatively low reference voltage, and (3) a threshold voltage that is intermediate the first and second reference voltages, an output signal of the third circuitry being a binary output signal of the DFE circuitry and also being used to control selection of which one of binary output signals of the first and second circuitries is used as an error signal;
circuitry for delaying the output signal of the DFE circuitry by progressively greater amounts of time to produce a plurality of delayed signals, each of the delayed signals being delayed by a respective one of the progressively greater amounts of time;
circuitry for multiplying each of the delayed signals by the error signal to produce a plurality of product signals, each one of the product signals being associated with a respective one of the delayed signals;
circuitry for using the one of the product signals associated with each respective one of the delayed signals to determine a respective weighting coefficient for the associated respective one of the delayed signals; and
circuitry for weighting each respective one of the delayed signals by the respective weighting coefficient associated with that respective one of the delayed signals to produce a respective one of the feedback signals.

15. The circuitry defined in claim 14 wherein the combiner circuitry performs an analog combining of the serial data signal and the feedback signals.

16. The circuitry defined in claim 14 wherein at any given time, the output signal of the DFE circuitry represents only a single bit of data information and the error signal also represents only a single bit of error information.

17. The circuitry defined in claim 14 wherein each of the progressively greater amounts of time is a respective different integer multiple of a time duration of one data bit in the serial data signal.

18. The circuitry defined in claim 16 wherein the circuitry for multiplying each of the delayed signals by the error signal has multiplication capability limited to multiplying only two bits together.

19. The circuitry defined in claim 16 wherein the circuitry for using comprises:
circuitry for discrete-time integration of successive product signals associated with each respective one of the delayed signals to produce a respective integrated signal associated with each respective one of the delayed signals; and
circuitry for determining the respective weighting coefficient for the associated respective one of the delayed signals from the integrated signal associated with that respective one of the delayed signals.

20. The circuitry defined in claim 14 wherein the respective weighting coefficient associated with each respective one of the delayed signals is an analog signal parameter.

* * * * *